United States Patent [19]
Suzuki et al.

[11] Patent Number: 6,130,279
[45] Date of Patent: Oct. 10, 2000

[54] RESIN COMPOSITION

[75] Inventors: Keiichiro Suzuki; Masahito Tada, both of Fukushima, Japan

[73] Assignee: Kureha Kagaku Kogyo K.K., Tokyo, Japan

[21] Appl. No.: 09/284,580

[22] PCT Filed: Oct. 16, 1997

[86] PCT No.: PCT/JP97/03739

§ 371 Date: Apr. 15, 1999

§ 102(e) Date: Apr. 15, 1999

[87] PCT Pub. No.: WO98/16585

PCT Pub. Date: Apr. 23, 1998

[30] Foreign Application Priority Data

Oct. 16, 1996 [JP] Japan .................................. 8-293153
Dec. 2, 1996 [JP] Japan .................................. 8-336364

[51] Int. Cl.⁷ .............................. C08K 3/28; C08K 3/38; C08K 5/52

[52] U.S. Cl. .................... 524/401; 524/430; 524/437; 435/809; 436/809

[58] Field of Search ..................... 524/401, 430, 524/437; 435/809; 436/809

[56] References Cited

U.S. PATENT DOCUMENTS 3,322,834  5/1967  Hill, Jr. et al. .
3,919,177  11/1975  Campbell .
4,645,826  2/1987  Iizuka et al. ........................... 528/388
4,933,386  6/1990  Nitoh et al. ........................... 524/127
5,137,959  8/1992  Block et al. ........................... 529/430
5,340,781  8/1994  Oda et al. ............................. 501/127

FOREIGN PATENT DOCUMENTS 0 499 585   8/1992   European Pat. Off. .
45-3368     2/1970   Japan .
52-12240    4/1977   Japan .
63-020340   1/1988   Japan .
63-33775    7/1988   Japan .
64-024859   1/1989   Japan .
3-126765    5/1991   Japan .
4-033958    2/1992   Japan .
4-198265    7/1992   Japan .
4-198266    7/1992   Japan .
4-55445     9/1992   Japan .
4-64533    10/1992   Japan .

OTHER PUBLICATIONS

Database WPI, Section Ch, Week 199235, Derwent Publications Ltd., London, GB; AN 1992–289001.

Primary Examiner—Nathan M. Nutter
Attorney, Agent, or Firm—McDermott, Will & Emery

[57] ABSTRACT

A resin composition comprising a poly(phenylene sulfide) resin and α-alumina, wherein the composition comprises (A) 15 to 45 wt. % of a poly(phenylene sulfide) resin having a melt viscosity of 5 to 100 Pa·s as measured at 310° C. and a shear rate of 1200/sec, and (B) 85 to 55 wt. % of α-alumina which contains α-alumina composed of α-crystals having an average particle size of at least 5 μm in a proportion of at least 40 wt. %.

8 Claims, No Drawings

RESIN COMPOSITION

This application claims the benefit under 35 USC 371 of PCT/JP97/03739 which has an international filing date of Oct. 16 1997.

TECHNICAL FIELD

The present invention relates to a resin composition comprising a poly(phenylene sulfide) resin and α-alumina (i.e., aluminum oxide powder of an α-crystal system), and particularly to a resin composition which comprises a poly (phenylene sulfide) resin and α-alumina highly filled into the resin and has excellent heat resistance, thermal conductibility and melt-flow properties. The present invention also relates to a resin composition suitable for use as a resin material for plastic microplates used in application fields such as the analysis of biochemical or biological specimens.

BACKGROUND ART

Injection-molded articles of thermoplastic resins are used in a wide variety of fields because of their high freedom of shape and excellent mass productivity. With the advancement of thermoplastic molding materials in recent years, various functions have been imparted to injection-molded articles, and so such molded articles have come to be used even as, for example, parts substitutive for the conventional metallic materials. However, the resin materials have an extremely low heat conductivity compared with the metallic materials, so that their developments in, for example, application fields of which good heat radiating property is required are limited.

More specifically, for example, a poly(phenylene sulfide) resin (hereinafter abbreviated as "PPS resin") is an engineering plastic excellent in heat resistance, flame retardancy, chemical resistance, dimensional stability, mechanical properties, electrical properties and the like, and use applications of injection-molded articles thereof are spread as electrical and electronic parts, precision instrument parts, automotive parts, etc. and are also developed into fields in which metallic materials have heretofore been used. However, the PPS resins have an extremely low heat conductivity, and so molded articles thereof are poor in thermal conductibility and heat radiating property and fail to efficiently radiate heat generated from various instruments and apparatus. As a result, in some cases, instruments and apparatus equipped with a part made of such a PPS resin may accumulate heat to a high temperature or have disadvantages such as melting, deterioration, decomposition, deformation, cracking and or the like of the PPS resin-made part.

Accordingly, it is desired to impart high thermal conductibility to heat-resistant thermoplastic resins such as PPS resins so as to be able to apply them to fields of various molded articles, of which good thermal conductibility and heat radiating property are required.

A microplate is an example of a resinous molded article of which high thermal conductibility is required. Various kinds of plastic microplates are used upon the analysis of a biochemical or biological specimen such as DNA, RNA or cells. A number of wells (recessed compartments) is generally provided in such a microplate. A variety of operations such as amplification of DNA, cell growth, and detection and quantitative determination of various materials or specimens is conducted in such wells. However, many of the conventional plastic microplates have not been suitable for use at a high temperature, since they are made from a general-purpose polymer such as polystyrene or polypropylene and are hence insufficient in heat resistance. It has also been difficult to heat such a plastic microplate to a target temperature in a short period of time due to their low heat conductivity.

These problems will hereinafter be described by specific examples. A polymerase chain reaction (PCR) method is a method in which an intended DNA in a specified region is amplified in a great amount from a small amount of a DNA specimen, and is applied to genetic diagnosis techniques, isolation and analysis of unknown genes, etc. In the PCR method, artificial single-stranded DNA fragments of 15 to 20 bases, which will serve as respective complementary primers to both 3'-terminal sides of a double-stranded DNA (100 to several thousands bases), are provided in great amounts. A tube is charged with a DNA intended to amplify, a thermophilic DNA polymerase such as a Tag polymerase and 4 kinds of deoxynucleotide triphosphates, and the mixture is heat treated at 93–96° C. for 30 seconds to 1 minute. By this treatment, the double-stranded DNA is converted into single strand DNAs due to dissociation of hydrogen bond (thermal denaturation of DNA).

When the temperature of this tube is dropped to 45–55° C., the complementary DNAs present in the great amounts each form a hydrogen bond at 3'-terminals of both single-stranded DNAs (annealing of primer). When the temperature is then raised to 70–72° C., a complementary DNA is synthesized from each 3'-terminal by the DNA polymerase using the short complementary DNA as a primer (elongation by DNA polymerase). In such a manner, a molecule of the DNA grows into 2 molecules of the DNA by the synthesis of a new complementary DNA. This cycle (thermal denaturation→annealing→elongation) is conducted repeatedly, whereby molecules of the n-th power of 2 come to be synthesized from 1 molecule after completion of the n-th cycle. One cycle is generally completed in about 2 to 5 minutes. In many cases, the cycle is repeated 20 to 35 times.

In the case of DNA diagnosis or the like, it is adopted to conduct the PCR method with a 96-well microplate. According to this method, the results of hybridization as to many specimens can be determined at once. In addition, the quantitative determination of the results can be conducted with ease.

In the PCR method, the step of holding the microplate at a temperature of about 95° C. for a short period of time is conducted at every cycle. In order to allow the thermal denaturation reaction to uniformly proceed, it is necessary for a specimen to reach the target temperature in a shorter period of time. However, the plastic microplates provided with a number of wells heretofore used in the PCR method have a low heat conductivity in addition to insufficient heat resistance, so that it has been difficult to heat them to a temperature of about 95° C. in a short period of time and to uniformly and efficiently conduct repeated temperature rise and temperature drop.

As methods for heating reaction wells in a plastic microplate used in the PCR method up to the target temperature in a shorter period of time, there have heretofore been used, for example, (1) a method in which the plastic microplate is brought into contact with a heating plate made of an aluminum block, (2) a method in which a copper block is attached to a bottom of the plastic microplate to heat the microplate through this block, and (3) a method in which high-temperature air is caused to flow between a heating plate and the plastic microplate to heat the microplate.

However, since the heat conductivity of a polymer is generally as low as about 0.5 W/mK, and so its thermal resistance is high, it has been difficult to cause wells in the plastic microplate to reach the target temperature in a short period of time even if these methods have been used.

Accordingly, even in the plastic microplates, there are demands for using thermoplastic resins excellent in heat resistance, chemical resistance, etc., such as PPS resins in place of the general-purpose polymers having poor heat resistance, and imparting high thermal conductibility to such resins.

As a method for improving the thermal conductibility of the PPS resin, it is considered to compound an inorganic filler having a high heat conductivity into such a resin. A typical inorganic filler having a high heat conductivity is metallic powder. When the metallic powder having a high heat conductivity is compounded into the PPS resin, however, the electrical insulating properties of the resin are impaired, and so such a composition cannot be applied to application fields of which high electrical insulating properties are required. Many of other inorganic fillers than the metallic powder are not always high in heat conductivity.

By the way, alumina among inorganic fillers is known as a material which has a heat conductivity at least 4 times as high as that of crystalline silica and is also chemically stable. However, general-purpose alumina has involved such problems that its filling ability to resins is poor, and the particles thereof are angular and hence have high wearability, and so such alumina is insufficient in utility as a filler. When the general-purpose alumina is filled in a great amount into a PPS resin to enhance the heat conductivity of the resin, there has been a problem that the melt-flow properties of the resin is deteriorated, and so injection molding becomes infeasible.

In order to enhance the heat conductivity of the PPS resin, there have heretofore been proposed (1) a resin composition for sealing electronic parts, comprising a PPS resin, and alumina, boron nitride and fibrous reinforcing material compounded into the resin (Japanese Patent Application Laid-Open No. 198265/1992) and (2) a resin composition comprising a PPS resin and at least one compounding ingredient selected from the group consisting of metal oxides, metal nitrides and boron nitride (Japanese Patent Application Laid-Open No. 198266/1992).

However, Examples of (1) Japanese Patent Application Laid-Open No. 198265/1992 and (2) Japanese Patent Application Laid-Open No. 198266/1992 only disclose resin compositions comprising alumina in a proportion of 10 to 40 wt. %, and resin compositions comprising alumina in a proportion of 30 to 50 wt. %, respectively. Therefore, no resin composition comprising alumina filled in a high proportion exceeding 50 wt. % is specifically disclosed.

On the other hand, according to the results of an investigation by the present inventors, it has been found that in order to provide a resin composition having excellent thermal conductibility as demonstrated by a heat conductivity of at least 1.5 W/m·K, preferably at least 2.0 W/m·K, more preferably at least 2.5 W/m·K using a PPS resin, it is necessary to compound alumina into the PPS resin in a proportion of at least 55 wt. %, preferably at least 70 wt. %, more preferably at least 75 wt. % based on the total weight of the resin composition. However, mere filling of the alumina in such a high proportion into the PPS resin involves a problem that no resin composition having satisfactory physical properties can be prepared or that the melt-flow properties of the resulting resin composition are deteriorated, and so such a composition is difficult to apply to melt processing techniques such as injection molding.

In order to apply a PPS resin composition to a use of microplates, it is necessary to limit the content of metallic ions, particularly, a Mg ion in the PPS resin to an extremely low level. The reason for it is that the Mg ion inhibits the activity of a Tag polymerase used in the PCR method.

DISCLOSURE OF THE INVENTION

It is an object of the present invention to provide a resin composition excellent in heat resistance, thermal conductibility and melt-flow properties.

Another object of the present invention is to provide a resin composition excellent in heat resistance and thermal conductibility and suitable for use as a material for plastic implements used in the analysis of biochemical or biological specimens. In particular, an object of the present invention is to provide a microplate provided with a number of wells, which has excellent heat resistance and thermal conductibility and can be applied to the PCR method.

The present inventors have carried out an extensive investigation with a view toward overcoming the above-described problems involved in the prior art. As a result, it has been found that when ① a PPS resin having a low melt viscosity is used as a heat-resistant resin, ② α-alumina composed of α-crystals having an average particle size of at least 5 μm is used as an inorganic filler having a high heat conductivity, and ③ the α-alumina is filled in a high proportion into the PPS resin, a heat-resistant resin composition, which is markedly improved in heat conductivity, has excellent melt-flow properties and can hence be subjected to injection molding, can be obtained.

As α-alumina, α-alumina composed of α-crystals having an average particle size smaller than 5 μm may be used in a specific proportion in combination with the α-alumina composed of the α-crystals having an average particle size of at least 5 μm. The α-alumina composed of the α-crystals having an average particle size of at least 5 μm is preferably spherical. In the resin composition according to the present invention, other fillers such as glass fibers may be used in combination in a low proportion for purposes of reinforcement and the like. However, when the resin composition according to the present invention is used as a material for plastic implements used in the analysis of biochemical or biological specimens, such as a microplate, it is preferred to control the Mg ion content in the composition to 200 ppm or lower. The present invention has been led to completion on the basis of these findings.

According to the present invention, there is provided a resin composition comprising a poly(phenylene sulfide) resin and α-alumina, wherein the composition comprises:

(A) 15 to 45 wt. % of a poly(phenylene sulfide) resin having a melt viscosity of 5 to 100 Pa·s as measured at 310° C. and a shear rate of 1200/sec, and (B) 85 to 55 wt. % of α-alumina which contains α-alumina composed of α-crystals having an average particle size of at least 5 μm in a proportion of at least 40 wt. %.

According to the present invention, there is also provided a microplate formed from a resin composition comprising (A) 15 to 45 wt. % of a poly(phenylene sulfide) resin having a melt viscosity of 5 to 100 Pa·s as measured at 310° C. and a shear rate of 1200/sec, and (B) 85 to 55 wt. % of α-alumina which contains α-alumina composed of α-crystals having an average particle size of at least 5 μm in a proportion of at least 40 wt. %.

BEST MODE FOR CARRYING OUT THE INVENTION

PPS Resin:

The PPS resin useful in the practice of the present invention can be obtained, for example, in accordance with ① a process disclosed in Japanese Patent Publication No. 3368/1970, in which a dihalo-aromatic compound is reacted with sodium sulfide in an organic amide solvent, ② a process disclosed in Japanese Patent Publication No. 12240/1977, in which a dihalo-aromatic compound is reacted with sodium sulfide in the presence of a carboxylic acid salt in an organic amide solvent, ③ a process disclosed in Japanese Patent Publication No. 33775/1988, in which a dihalo-aromatic compound is reacted with sodium sulfide in the presence of water in an organic amide solvent, ④ a process disclosed in Japanese Patent Publication No. 64553/1992, in which a purified prepolymer is polymerized in an organic solvent, or ⑤ a process disclosed in Japanese Patent Publication No. 55445/1992, in which impurities are extracted in a neutral state in the presence of an organic amide and water.

The PPS resin used in the present invention is preferably a linear polymer. The linear PPS resin is a substantially linear polymer obtained by polymerizing a monomer composed mainly of a bifunctional monomer in the presence of a polymerization aid such as sodium acetate or water. On the other hand, a PPS resin of the crosslinked type is a polymer obtained by subjecting a polymer of a low polymerization degree obtained by polymerizing a monomer without using any polymerization aid to oxidative crosslinking to thicken (cure) it. Such a crosslinked PPS resin is not preferred because it is poor in flexibility, toughness, strength and the like.

The PPS resin is preferably a polymer obtained in accordance with the process disclosed in Japanese Patent Publication No. 33775/1988 among the above-described preparation processes, in which an alkali metal sulfide and a dihalo-aromatic compound are subjected to specific two-stage heat-up polymerization in the presence of water in a polar solvent such as N-methylpyrrolidone.

As examples of the alkali metal sulfide, may be mentioned lithium sulfide, sodium sulfide, potassium sulfide, rubidium sulfide and cesium sulfide. Sodium sulfide formed by the reaction of NaSH and NaOH in the reaction system may also be used.

As examples of the dihalo-aromatic compound, may be mentioned p-dichlorobenzene, m-dichlorobenzene, 2,5-dichlorotoluene, p-dibromobenzene, 2,6-dichloronaphthalene, 1-methoxy-2,5-dichlorobenzene, 4,4'-dichlorobiphenyl, 3,5-dichlorobenzoic acid, p,p'-dichlorodiphenyl ether, 4,4'-dichlorodiphenyl sulfone, 4,4'-dichlorodiphenyl sulfoxide and mixtures of two or more compounds thereof.

The PPS resin used in the present invention is preferably a polymer containing a p-phenylene sulfide unit in a proportion of at least 50 wt. %, preferably at least 70 wt. %, more preferably at least 80 wt. %. A poly(phenylene sulfide), and a poly(phenylene sulfide/m-phenylene sulfide) copolymer containing a m-phenylene sulfide unit as a minor component are particularly preferred. If the proportion of the p-phenylene sulfide unit is too low, the physical properties of the resulting copolymer may be deteriorated in some cases.

The linear PPS resin may contain some branched or crosslinked structure so far as it is substantially linear. More specifically, some branched structure may be introduced into the PPS resin by causing a small amount of a halogenated aromatic compound having at least 3 halogen substituents per molecule, such as 1,3,5-trichlorobenzene, to exist upon polymerization.

The PPS resin used in the present invention is a polymer having a melt viscosity within a range of from 5 to 100 Pa·s as measured at 310° C. and a shear rate of 1200/sec. If the melt viscosity of the PPS resin is too low, the strength of a molded article formed from the resulting resin composition is lowered. If the melt viscosity of the PPS resin exceeds 100 Pa·s, it is difficult to fill the α-alumina in a high proportion into such a resin. The melt viscosity of the PPS resin is preferably 5 to 60 Pa·s, more preferably 10 to 40 Pa·s.

A compounding proportion of the PPS resin is 15 to 45 wt. %, preferably 15 to 30 wt. %, more preferably 15 to 25 wt. %. If the compounding proportion of the PPS resin is too low, it is difficult to fill the α-alumina in a high proportion into the resin, or the melt-flow properties of the resulting resin composition are deteriorated, and so it is difficult to conduct injection molding. If the compounding proportion of the PPS resin is too high, the heat conductivity of the resulting resin composition is lowered.

α-Alumina:

In the present invention, α-alumina (powder) is used as an inorganic filler having a high heat conductivity. α-Alumina (B1) composed of α-crystals having an average particle size of at least 5 μm is used as the α-alumina. More specifically, α-crystals constituting the α-alumina (B1) used in the present invention have an average particle size of at least 5 μm, preferably 5 to 80 μm, more preferably 10 to 50 μm. The average particle size of the α-alumina is a value measured by means of a scanning electronic microscope (SEM). The α-alumina (B1) composed of α-crystals having a great average particle size does substantially not aggregate, and so a resin composition exhibiting good melt-flow properties can be provided even when such alumina is filled in a proportion as high as 85 wt. %. So long as the melt-flow properties of the resin composition are good, the composition may be molded by a melt processing technique such as injection molding like conventional thermoplastic resins.

Alumina (aluminum oxide) is generally obtained by dehydrating and calcining aluminum hydroxide at 1,000° C. or higher. α-Alumina of an α-crystal system is generally used as alumina for a filler. However, the size of its primary particles (size of α-crystal) is of the order of 0.1 to 4 μm. Powder composed of aggregate of these α-crystal particles, or powder ground up to a primary particle size is used as a raw material for ceramics or a filler. When the α-alumina composed of such small-sized α-crystals is filled in a great amount into the PPS resin, however, the melt-flow properties of the resulting resin composition is markedly deteriorated, and so its molding becomes difficult or infeasible under conditions for the conventional melt processing such as injection molding due to its insufficient flow properties.

The α-alumina composed of the α-crystals having an average particle size of at least 5 μm is preferably spherical. Examples of such spherical α-alumina having a great average particle size include AS series such as AS-10 (average particle size: 37 μm), AS-20 (average particle size: 20 μm), AS-30 (average particle size: 16 μm) and AS-50 (average particle size: 10 μm) produced by Showa Denko K.K. The use of such α-alumina (B1) composed of the α-crystals having a great average particle size, and the PPS resin having a low melt viscosity permits the provision of a resin composition having excellent melt-flow properties even when the α-alumina is filled in a high proportion into the PPS resin. The spherical α-alumina involves no problem of high wearability because its particles are not angular. If the wearability of the α-alumina is high, an injection-molding machine and the like are worn or damaged.

In the present invention, the α-alumina is compounded in a proportion of 85 to 55 wt. % based on the total weight of the resin composition. If the compounding proportion of the α-alumina is too low, it is impossible to provide a resin composition having a high heat conductivity. If the compounding proportion of the α-alumina exceeds 85 wt. %, it is difficult to prepare a resin composition, or the melt-flow properties of the resulting resin composition are impaired, and so its injection molding becomes difficult. The compounding proportion of the α-alumina is preferably 85 to 70 wt. %, more preferably 85 to 75 wt. %.

It is preferred from the viewpoints of filling ability, melt-flow characteristic and heat conductivity that the α-alumina (B1) composed of the α-crystals having an average particle size of at least 5 μm should account for the whole amount of the α-alumina used in the present invention. However, a part thereof may be general-purpose α-alumina (B2) composed of α-crystals having an average particle size smaller than 5 μm. In this case, the content of the α-alumina (B1) composed of the α-crystals having an average particle size of at least 5 μm must be controlled to at least 40 wt. %, preferably at least 50 wt. %. Accordingly, the α-alumina (B2) of composed of the α-crystals having the smaller particle size is used in a proportion of 0 to 60 wt. %, preferably 0 to 50 wt. % based on the whole α-alumina. If the content of the α-alumina (B2) in the whole α-alumina is too high, it is impossible to fill the α-alumina in a high proportion into the PPS resin, or the flow properties of the resulting resin composition are impaired.

Filler:

In the present invention, other fillers (fibrous fillers and/or non-fibrous fillers) than the α-alumina may be compounded in a proportion of 0 to 30 wt. % based on the total weight of the composition.

In the resin compositions according to the present invention, other fillers than the α-alumina are not always essential components. In order to provide molded articles excellent in various properties such as mechanical strength, heat resistance, dimensional stability and electrical properties, however, various kinds of fillers may be compounded according to the purposes thereof.

The fibrous fillers are mainly compounded for reinforcement. As specific examples thereof, may be mentioned inorganic fibrous materials such as glass fibers, carbon fibers, asbestos fibers, silica fibers, alumina fibers, zirconia fibers, boron nitride fibers, silicon nitride fibers, boron fibers and potassium titanate fibers; metallic fibrous materials such as stainless steel, aluminum, titanium, copper and brass; and high-melting organic fibrous materials such as polyamide, fluorocarbon resins, polyester resins and acrylic resins. The inorganic fibrous materials such as glass fibers are preferred from the viewpoints of electrical insulating properties and heat resistance of the resulting resin composition.

Examples of the non-fibrous fillers include particulate or powdery fillers such as mica, silica, talc, kaolin, calcium sulfate, barium sulfate, carbon black, graphite, ferrite, clay, glass powder, calcium carbonate, nickel carbonate, magnesium carbonate, zinc oxide, titanium oxide, iron oxide and quartz powder.

These fillers may be use either singly or in any combination thereof. The fillers may be treated with greige goods or surface-treating agents as needed. Examples of the greige goods or surface-treating agents include functional compounds such as epoxy compounds, isocyanate compounds, silane compounds and titanate compounds. These compounds may be used for conducting a surface treatment or collecting treatment in advance or added at the same time upon the preparation of materials.

The proportion of the filler used is generally 0 to 30 wt. %, preferably 0 to 15 wt. %, more preferably 0 to 10 wt. % though it varies according to the kind and specific gravity thereof, the purpose of use, application fields, and the like. If the proportion of the filler used is too low, the filling effect thereof becomes small. If the proportion is too high on the other hand, the improving effect of the α-alumina on thermal conductibility is lowered.

Into the resin compositions according to the present invention, may be compounded, in addition to these fillers, antioxidants, lubricants, ultraviolet absorbents, nucleating agents, flame retardants, colorants such as dyes and pigments, other thermoplastic and thermosetting resins than those described above, etc. as needed.

Resin Composition:

The resin compositions according to the present invention can be prepared by equipments and methods generally used in the preparation of synthetic resin compositions. More specifically, necessary components can be mixed and kneaded in a single-screw or twin-screw extruder and extruded into pellets for molding. There may also be used a method in which a part of the necessary components is mixed as a masterbatch, and the mixture is molded, or a method in which a part of raw materials used is ground for the purpose of successfully conducting dispersion and mixing of the individual components, thereby making the particle sizes of the components uniform, and they are mixed and melt extruded.

Since the resin compositions according to the present invention have good melt-flow properties though the content of the α-alumina is high, they can be molded and processed into various molded articles under the conventional melt-molding and processing conditions for PPS resins in accordance with various molding methods such as injection molding and compression molding. The resin compositions according to the present invention may preferably be molded into various molded articles by injection molding.

The heat conductivity of the resin compositions according to the present invention is generally at least 1.5 W/m·K, preferably at least 2.0 W/m·K, more preferably at least 2.5 W/m·K, and so the compositions exhibit excellent thermal conductibility. It is also possible to control the heat conductivity to at least 3.0 W/m·K, preferably at least 3.5 W/m·K when the composition is used in application fields such as microplates, of which a particularly high heat conductivity is required. In the present invention, the α-alumina is used as a filler having a high heat conductivity, so that the electrical insulating properties of the PPS resin are not impaired.

Accordingly, the resin compositions according to the present invention are suitable for use as molded articles in fields of which high thermal conductibility and heat radiating property are required.

When the resin compositions according to the present invention are used as materials for plastic implements used in the analysis of biochemical or biological specimens, such as microplates, the content of a Mg ion in each composition is preferably controlled to 200 ppm or lower. The Mg ion affects the activity of a Tag polymerase used in the PCR method. If its content in the composition exceeds 200 ppm, the activity thereof is inhibited to a great extent. The Mg ion content is preferably 100 ppm or lower. In order to reduce the Mg ion content, it is preferred to avoid being contaminated with Mg ions upon the preparation of the PPS resin and use purified compounding ingredients.

The resin compositions according to the present invention can be suitably used as, for example, members for the analysis of biochemical specimens, members for the analysis of biological specimens, etc. The resin compositions according to the present invention are particularly suitable for use as microplates provided with at least one well (also referred to as a recessed compartment, hole, non-through-hole or recess) or microplates for heat transfer provided with through-holes. These microplates are suitably used in place of metallic microplates machined from a metal block upon analysis by the PCR method in which extreme thermal shock must be applied in a short period of time. In particular, the microplates according to the present invention are suitably used upon the analysis of a large amount of specimens by the PCR method. The microplates may be equipped with accessories such as a filtration film.

EXAMPLES

The present invention will hereinafter be described more specifically by the following Examples and Comparative Examples. It should however be borne in mind that the present invention is not limited to these examples only.

Example 1

A component composed of 18 wt. % of a poly(phenylene sulfide) resin (product of Kureha Kagaku Kogyo K.K.; melt viscosity measured at 310° C. and a shear rate of 1200/sec: 20 Pa·s), 80 wt. % of α-alumina composed of α-crystals having an average particle size of 10 μm (AS-50, product of Showa Denko K.K.) and 2 wt. % of glass fibers having a diameter of 9 μm was stirred and mixed in a high-speed stirring apparatus (Supermixer, manufactured by Kawata K.K.) and then extruded from a twin-screw kneader extruder (PCM-45, manufactured by Ikegai Corp.) into pellets, thereby obtaining α-alumina-filled pellets.

The α-alumina-filled pellets obtained above were molded into a flat plate 120×100×3 (mm) in size by means of an injection molding machine (J-75ED, manufactured by The Japan Steel Works, Ltd.) at a cylinder temperature of 320° C. and a mold temperature of 180° C. The heat conductivity of the thus-obtained flat plate was measured and was found to be 2.9 W/m·K.

Example 2

A component composed of 15 wt. % of a poly(phenylene sulfide) resin (product of Kureha-Kagaku Kogyo K.K.; melt viscosity measured at 310° C. and a shear rate of 1200/sec: 20 Pa·s) and 85 wt. % of α-alumina composed of α-crystals having an average particle size of 20 μm (AS-20, product of Showa Denko K.K.) was stirred and mixed in the high-speed stirring apparatus (Supermixer, manufactured by Kawata K.K.) and then extruded from the twin-screw kneader extruder (PCM-45, manufactured by Ikegai Corp.) into pellets, thereby obtaining α-alumina-filled pellets.

The α-alumina-filled pellets obtained above were molded into a flat plate 120×100×3 (mm) in size by means of the injection molding machine (J-75ED, manufactured by The Japan Steel Works, Ltd.) at a cylinder temperature of 320° C. and a mold temperature of 180° C. The heat conductivity of the thus-obtained flat plate was measured and was found to be 3.8 W/m·K.

Example 3

A component composed of 20 wt. % of a poly(phenylene sulfide) resin (product of Kureha Kagaku Kogyo K.K.; melt viscosity measured at 310° C. and a shear rate of 1200/sec: 20 Pa·s) and 80 wt. % of α-alumina composed of α-crystals having an average particle size of 20 μm (AS-20, product of Showa Denko K.K.) was stirred and mixed in the high-speed stirring apparatus (Supermixer, manufactured by Kawata K.K.) and then extruded from the twin-screw kneader extruder (PCM-45, manufactured by Ikegai Corp.) into pellets, thereby obtaining α-alumina-filled pellets.

The α-alumina-filled pellets obtained above were molded into a flat plate 120×100×3 (mm) in size by means of the injection molding machine (J-75ED, manufactured by The Japan Steel Works, Ltd.) at a cylinder temperature of 320° C. and a mold temperature of 180° C. The heat conductivity of the thus-obtained flat plate was measured and was found to be 2.9 W/m·K.

Example 4

A component composed of 18 wt. % of a poly(phenylene sulfide) resin (product of Kureha Kagaku Kogyo K.K.; melt viscosity measured at 310° C. and a shear rate of 1200/sec: 20 Pa·s), 40 wt. % of α-alumina composed of α-crystals having an average particle size of 10 μm (AS-50, product of Showa Denko K.K.), 40 wt. % of α-alumina composed of α-crystals having an average particle size of 3 μm (AL-15-H, product of Showa Denko K.K.) and 2 wt. % of glass fibers having a diameter of 9 μm was stirred and mixed in the high-speed stirring apparatus (Supermixer, manufactured by Kawata K.K.) and then extruded from the twin-screw kneader extruder (PCM-45, manufactured by Ikegai Corp.) into pellets, thereby obtaining α-alumina-filled pellets.

The α-alumina-filled pellets obtained above were molded into a flat plate 120×100×3 (mm) in size by means of the injection molding machine (J-75ED, manufactured by The Japan Steel Works, Ltd.) at a cylinder temperature of 320° C. and a mold temperature of 180° C. The heat conductivity of the thus-obtained flat plate was measured and was found to be 2.7 W/m·K.

Comparative Example 1

A component composed of 20 wt. % of a poly(phenylene sulfide) resin (product of Kureha Kagaku Kogyo K.K.; melt viscosity measured at 310° C. and a shear rate of 1200/sec: 20 Pa·s) and 80 wt. % of α-alumina composed of α-crystals having an average particle size of 3 μm (AL-15-H, product of Showa Denko K.K.) was stirred and mixed in the high-speed stirring apparatus (Supermixer, manufactured by Kawata K.K.) and then extruded from the twin-screw kneader extruder (PCM-45, manufactured by Ikegai Corp.) into pellets, thereby obtaining α-alumina-filled pellets.

It was attempted to mold the α-alumina-filled pellets obtained above into a flat plate 120×100×3 (mm) in size by means of the injection molding machine (J-75ED, manufactured by The Japan Steel Works, Ltd.) at a cylinder temperature of 320° C. and a mold temperature of 180° C. However, no molded article was able to be obtained due to the insufficient flow properties of the composition.

Comparative Example 2

A component composed of 18 wt. % of a poly(phenylene sulfide) resin (product of Kureha Kagaku Kogyo K.K.; melt viscosity measured at 310° C. and a shear rate of 1200/sec: 120 Pa·s), 80 wt. % of α-alumina composed of α-crystals having an average particle size of 10 μm (AS-50, product of Showa Denko K.K.) and 2 wt. % of glass fibers having a diameter of 9 μm was stirred and mixed in the high-speed stirring apparatus (Supermixer, manufactured by Kawata K.K.). It was then attempted to extrude the resultant composition from the twin-screw kneader extruder (PCM-45, manufactured by Ikegai Corp.) into pellets. However, the extruder was stopped due to the insufficient flow properties of the composition, and so no pellet was obtained.

Comparative Example 3

A component composed of 13 wt. % of a poly(phenylene sulfide) resin (product of Kureha Kagaku Kogyo K.K.; melt viscosity measured at 310° C. and a shear rate of 1200/sec: 20 Pa·s) and 87 wt. % of α-alumina composed of α-crystals having an average particle size of 20 μm (AS-20, product of Showa Denko K.K.) was stirred and mixed in the high-speed stirring apparatus (Supermixer, manufactured by Kawata K.K.). It was then attempted to extrude the resultant composition from the twin-screw kneader extruder (PCM-45, manufactured by Ikegai Corp.) into pellets. However, the extruder was stopped due to the insufficient flow properties of the composition, and so no pellet was obtained.

Comparative Example 4

A component composed of 18 wt. % of a poly(phenylene sulfide) resin (product of Kureha Kagaku Kogyo K.K.; melt viscosity measured at 310° C. and a shear rate of 1200/sec: 20 Pa·s), 30 wt. % of α-alumina composed of α-crystals having an average particle size of 10 μm (AS-50, product of Showa Denko K.K.), 50 wt. % of α-alumina composed of α-crystals having an average particle size of 3 μm (AL-15-H, product of Showa Denko K.K.) and 2 wt. % of glass fibers having a diameter of 9 μm was stirred and mixed in the high-speed stirring apparatus (Supermixer, manufactured by Kawata K.K.) and then extruded from the twin-screw kneader extruder (PCM-45, manufactured by Ikegai Corp.) into pellets, thereby obtaining α-alumina-filled pellets.

It was attempted to mold the α-alumina-filled pellets obtained above into a flat plate 120×100×3 (mm) in size by means of the injection molding machine (J-75ED, manufactured by The Japan Steel Works, Ltd.) at a cylinder temperature of 320° C. and a mold temperature of 180° C. However, no molded article was able to be obtained due to the insufficient flow properties of the composition.

The results of these examples are shown collectively in Table 1.

TABLE 1

| | Composition | | | | | | |
|---|---|---|---|---|---|---|---|
| | PPS | | Alumina powder | | | | Heat |
| | Melt | | Particle size of | | Glass fiber | | conduc- |
| | viscos-ity. (Pa · s) | Amount added (wt. %) | α-crystal (μm) | Amount added (wt. %) | Dia-meter (μm) | Amount added (wt. %) | tivity (W/ m · K) |
| Ex. 1 | 20 | 18 | 10 | 80 | 9 | 2 | 2.9 |
| Ex. 2 | 20 | 15 | 20 | 85 | — | — | 3.8 |
| Ex. 3 | 20 | 20 | 20 | 80 | — | — | 2.9 |
| Ex. 4 | 20 | 18 | 10 3 | 40 40 | 9 | 2 | 2.7 |
| Comp. Ex. 1 | 20 | 20 | 3 | 80 | — | — | —(*1) |
| Comp. Ex. 2 | 120 | 18 | 10 | 80 | 9 | 2 | —(*2) |
| Comp. | 20 | 13 | 20 | 87 | — | — | —(*2) |

TABLE 1-continued

| | Composition | | | | | | |
|---|---|---|---|---|---|---|---|
| | PPS | | Alumina powder | | | | Heat |
| | Melt | | Particle size of | | Glass fiber | | conduc- |
| | viscos-ity. (Pa · s) | Amount added (wt. %) | α-crystal (μm) | Amount added (wt. %) | Dia-meter (μm) | Amount added (wt. %) | tivity (W/ m · K) |
| Ex. 3 | | | | | | | |
| Comp. Ex. 4 | 20 | 18 | 10 3 | 30 50 | 9 | 2 | —(*1) |

(*1)No injection-molded article was able to be obtained due to insufficient flow properties.
(*2)No pellet was able to be obtained by the extruder due to insufficient flow properties.

Example 5

A 20-liter Henschel mixer was charged with 4 kg (20 wt. %) of a poly(phenylene sulfide) resin (product of Kureha Kagaku Kogyo K.K.; melt viscosity measured at 310° C. and a shear rate of 1200/sec: 20 Pa·s) and 16 kg (80 wt. %) of α-alumina (AS-50, product of Showa Denko K.K.; average particle size: 10 μm) to mix and stir the contents. The resultant mixture was fed to a twin-screw extruder, and the cylinder temperature was set at a temperature of from 280° C. to 340° C. to melt and knead the mixture, thereby obtaining a pelletized composition.

The pellets thus obtained were fed to an injection molding machine (J75E, manufactured by The Japan Steel Works, Ltd.), and the cylinder temperature was set at a temperature of from 280° C. to 340° C. to mold the pellets into a microplate (10.5 cm long, 8 cm wide and 1.3 cm thick) provided with 12 wells each having a diameter of 2 cm and a depth of 1 cm at a mold temperature of 180° C.

After one of the microplates thus obtained was ground and subjected to a pretreatment, the Mg ion content in the composition was determined by an ICP306 Model manufactured by Hitachi Ltd. As a result, it was found to be lower than 1 ppm. On the other hand, a plate-like molded article 100 mm long, 130 mm wide and 3 mm thick was produced from the resin composition to measure its heat conductivity. As a result, it was found to be 3.8 W/mK.

The microplate obtained above was held between hot plates heated to 97° C. to measure a temperature of the microplate at the bottom of the well. As a result, it was found that the bottom of the well was heated to 95° C. in 60 seconds.

Comparative Example 5

Microplates and a plate-like molded article were obtained in accordance with the same process as in Example 5 except that a 20-liter Henschel mixer was charged with 12 kg (60 wt. %) of the poly(phenylene sulfide) resin and 8 kg (40 wt. %) of the α-alumina. The Mg ion content in the composition was determined in the same manner as in Example 5 and was found to be lower than 1 ppm. The heat conductivity of the resultant molded article was 1.0 W/mK.

The microplate obtained above was held between hot plates heated to 97° C. to measure a temperature of the microplate at the bottom of the well. As a result, it was found that the bottom of the well was heated to 70° C. in 60 seconds.

Comparative Example 6

A poly(phenylene sulfide) resin (product of Kureha Kagaku Kogyo K.K.; melt viscosity measured at 310° C. and a shear rate of 1200/sec: 220 Pa·s) was fed to a twin-screw extruder, and the cylinder temperature was set at a temperature of from 280° C. to 300° C. to melt and knead the resin, thereby obtaining a pelletized composition. The pellets thus obtained were fed to the injection molding machine (J75E, manufactured by The Japan Steel Works, Ltd.), and the cylinder temperature was set at a temperature of from 280° C. to 300° C. to mold the pellets into a microplate (10.5 cm long, 8 cm wide and 1.3 cm thick) provided with 12 wells each having a diameter of 2 cm and a depth of 1 cm at a mold temperature of 140° C.

The Mg ion content in the composition was determined in the same manner as in Example 5 and was found to be lower than 1 ppm. A plate-like molded article 100 mm long, 130 mm wide and 3 mm thick was produced from the resin composition to measure its heat conductivity. As a result, it was found to be 0.4 W/mK. The microplate obtained above was held between hot plates heated to 97° C. to measure a temperature of the microplate at the bottom of the well. As a result, it was found that the bottom of the well was heated to 45° C. in 60 seconds.

INDUSTRIAL APPLICABILITY

According to the present invention, there are provided resin compositions which comprise a poly(phenylene sulfide) resin and α-alumina highly filled into the resin and have excellent heat resistance, thermal conductibility and melt-flow properties. The resin compositions according to the present invention can be applied to melt processing techniques such as injection molding and are suitable for use, for example, as molded articles in fields, such as electrical and electronic parts, precision instrument parts and automotive parts, of which high thermal conductivity and heat radiating property are required.

According to the present invention, there are also provided resin compositions excellent in heat resistance and thermal conductibility and suitable for use as materials for plastic implements used in the analysis of biochemical or biological specimens. In particular, microplates provided with a number of wells, which can be applied to the PCR method, are provided as the plastic implements excellent in heat resistance and thermal conductibility. The microplates according to the present invention are sufficiently fit for analysis by the PCR method in which extreme thermal shock must be applied in a short period of time.

What is claimed is:

1. A resin composition comprising a poly(phenylene sulfide) resin and α-alumina, wherein the composition comprises:

(A) 15 to 45 wt. % of a poly(phenylene sulfide) resin having a melt viscosity of 5 to 100 Pa·s as measured at 310° C. and a shear rate of 1200/sec, and (B) 85 to 55 wt. % of α-alumina which contains α-alumina (B1) composed of α-crystals having an average particle size of at least 5 μm in a proportion of at least 40 wt. %.

2. The resin composition according to claim 1, wherein the α-alumina (B1) is α-alumina composed of α-crystals having an average particle size of 5 to 80 μm.

3. The resin composition according to claim 1, wherein the α-alumina contains 40 to 100 wt. % of the α-alumina (B1) composed of α-crystals having an average particle size of 5 to 80 μm and 0 to 60 wt. % of α-alumina (B2) composed of α-crystals having an average particle size smaller than 5 μm.

4. The resin composition according to claim 1 which has a heat conductivity of at least 1.5 W/m·K.

5. The resin composition according to claim 1, which has a Mg ion content of 200 ppm or lower.

6. The resin composition according to claim 1 which further comprises (C) at least one filler selected from the group consisting of fibrous fillers and non-fibrous fillers other than the α-alumina within a range of 0 to 30 wt. % based on the total weight of the resin composition.

7. A microplate formed from a resin composition comprising (A) 15 to 45 wt. % of a poly(phenylene sulfide) resin having a melt viscosity of 5 to 100 Pa·s as measured at 310° C. and a shear rate of 1200/sec, and (B) 85 to 55 wt. % of α-alumina which contains α-alumina (B1) composed of α-crystals having an average particle size of at least 5 μm in a proportion of at least 40 wt. %.

8. The microplate according to claim 7, wherein the resin composition has a Mg ion content of 200 ppm or lower.

* * * * *